No. 687,504. Patented Nov. 26, 1901.
F. M. RITES.
GOVERNOR.
(Application filed Dec. 8, 1899.)
(No Model.)
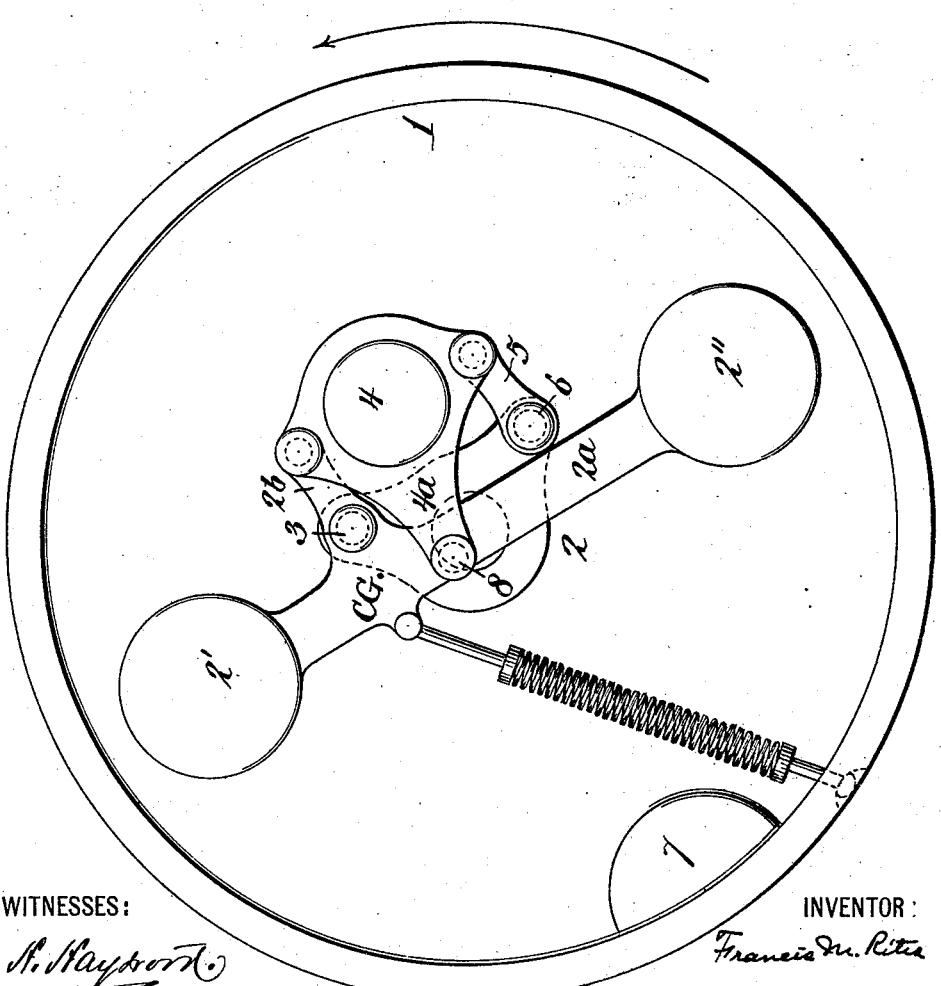
WITNESSES:
INVENTOR:
Francis M. Rites
BY
E. M. Marbleson
ATTORNEYS

UNITED STATES PATENT OFFICE.

FRANCIS M. RITES, OF ITHACA, NEW YORK.

GOVERNOR.

SPECIFICATION forming part of Letters Patent No. 687,504, dated November 26, 1901.

Original application filed February 6, 1899, Serial No. 704,670. Divided and this application filed December 8, 1899. Serial No. 739,612. (No model.)

*To all whom it may concern:*

Be it known that I, FRANCIS M. RITES, a citizen of the United States, residing at Ithaca, in the county of Tompkins and State of New York, have invented certain new and useful Improvements in Governors; and I do hereby declare the following to be a full, clear, and exact description of the invention, such as will enable others skilled in the art to which it appertains to make and use the same.

My invention relates generally to improvements in governors or speed-regulators, and particularly to improvements in governors of the type known as "fly-wheel" or "automatic cut-off" governors, though the governor herein described may be adapted for the regulation of throttle-valves or the tripping-gear of a Corliss engine or any other devices for the operation of which governors are employed.

My invention consists in the novel combination and arrangement of movable weights by which a governor-weight structure utilizing in its operation both centrifugal force and inertia and balanced as to gravity with respect to its supports is produced.

This application is a division of my application for Letters Patent for improvements in governors filed February 6, 1899, Serial No. 704,670.

The objects of my invention are to improve and simplify governors, to utilize efficiently both "centrifugal force," so called, and the inertia of the governor-weights, and to make the governor quick-acting, sensitive, reliable, not liable to derangement, and comparatively inexpensive. These objects are attained in the governor herein described, and illustrated in the drawings which accompany and form a part of this specification, in which the same reference-numerals indicate the same or corresponding parts, and in which—

Figure 1 is an elevation of the governor mounted upon a revoluble fly-wheel, and Fig. 2 is a central transverse section thereof.

In the drawings, 1 is the fly-wheel or carrier, and 2 is a weight which for convenience may be termed the "primary" weight. This weight 2 consists of an arm $2^a$, having at its ends weight masses $2'$ and $2''$. It is pivoted to the fly-wheel by a pivot-pin 3 and is provided with an extended arm $2^b$, to which another weight 4, which may be termed the "secondary" weight, is pivoted. This weight 4, besides being pivoted to the arm $2^b$, has pivoted to it an arm 5, which is also pivoted to the fly-wheel or carrier 1 at a point 6 and is substantially parallel to the arm $2^b$ of the weight 2. The secondary weight 4 is so placed that it balances with respect to the pivot-pin 3 the otherwise-unbalanced gravity of the weight 2. The entire governor-weight structure is counterbalanced for rotation by a weight mass 7, formed on the fly-wheel 1.

The secondary weight 4 is provided with an extended arm $4^a$, terminating near the center of the fly-wheel, which carries an eccentric-pin 8, by which the valve of the engine may be operated; but I do not limit myself to mounting the eccentric upon the secondary weight.

The operation of this governor is as follows: When the fly-wheel 1 revolves, the action of the centrifugal force tends to move the center of gravity of the weight 2 upward. Such movement of the weight 2 moves the weight 4 in the opposite direction, thus carrying the eccentric-pin 8 toward the center of the shaft. Because of the peculiar connection of the weight 4 to the fly-wheel and weight 2 the motion of the eccentric is in nearly a straight line, its motion being that of an object controlled by two parallel links, which are nearly at right angles to the direction of the motion. The weight 4 is practically unaffected by centrifugal force, but does not interfere with the movement of the weight 2 under the influence of centrifugal force. The weight 4 has a powerful inertia action, however, during times when the speed of the engine is changing, for at such times the inertia tends to move it in a direction substantially at right angles to the link 5 and arm $2^b$. The inertia action of the weight 4 reinforces the combined centrifugal and inertia action of the weight 2, tending to move the eccentric outward when the speed of the engine drops suddenly and to move the eccentric inward when the speed of the engine increases suddenly.

Having thus completely described my invention, what I claim, and desire to secure by Letters Patent, is—

1. In a governor, the combination, with a revoluble fly-wheel or carrier, of two weights, one pivoted eccentrically to the carrier, and having weight masses disposed on opposite sides of its pivotal point, the other weight directly connected to the first at a point to one side of a line connecting said weight masses and intermediate between said masses, a link connecting said second weight to the carrier, means for resisting the centrifugal force of the weight structure, and an actuating device adjusted by the movements of the weights.

2. In a governor, the combination, with a revoluble fly-wheel or carrier, of two weights, one pivoted eccentrically to the carrier, and having weight masses disposed on opposite sides of its pivotal point, the other weight directly connected to a lateral projection of said first weight located at a point intermediate of the weight masses thereof, a link connecting said second weight to the carrier and arranged approximately parallel to the said lateral projection, means for resisting centrifugal action of the weight structure, and an actuating device adjusted by the movement of the weights.

3. In a governor, the combination, with a revoluble fly-wheel or carrier, of two weights, one, an arm, pivoted eccentrically to the carrier, the second weight being pivotally connected to the first weight at a point the radius of which is substantially at right angles with the arm, a link forming a second connection of said second weight with the carrier and arranged approximately parallel to the said radius, means for resisting centrifugal action of the weight structure, and an actuating device adjusted by the movement of the weights.

4. In a governor, the combination, with a revoluble fly-wheel or carrier, of two weights, one, an arm, pivoted eccentrically to the carrier, the second weight being pivotally connected to the first at a point the radius of which is substantially at right angles with the arm, a link forming a second connection of said weight with the carrier and arranged approximately parallel to the radius, means for resisting centrifugal action of the weight structure, and an actuating device carried by the second weight and adjusted by the movement of the weights.

5. In a governor, the combination, with a revoluble fly-wheel or carrier, of two weights, one pivoted eccentrically to the carrier, the other connected to the first weight and having its motion controlled by two pivoted and approximately parallel members, both pivotally connected to the carrier and the said second weight, means for resisting centrifugal action of the weight structure, and an actuating device carried by the said second weight, and adjusted by the movement thereof.

In testimony whereof I affix my signature in the presence of two witnesses.

FRANCIS M. RITES.

Witnesses:
E. H. TUCKER,
H. M. MARBLE.